United States Patent [19]

Evans et al.

[11] Patent Number: 5,010,708
[45] Date of Patent: Apr. 30, 1991

[54] CORNER LOCK

[75] Inventors: Harold H. Evans, Hudson, Wis.; Todd W. Bruchu, Lake Elmo, Minn.

[73] Assignee: Anderson Corporation, Bayport, Minn.

[21] Appl. No.: 321,730

[22] Filed: Mar. 10, 1989

[51] Int. Cl.$^5$ .............................................. F16B 7/00
[52] U.S. Cl. ..................................... 52/656; 403/402; 403/295
[58] Field of Search ................ 52/656; 403/295, 297, 403/401, 402, 403

[56] References Cited

U.S. PATENT DOCUMENTS

| | | | |
|---|---|---|---|
| 111,128 | 1/1871 | Linscott. | |
| 1,242,815 | 10/1917 | Kohler. | |
| 1,672,419 | 6/1928 | Lehman. | |
| 1,817,162 | 8/1931 | Mulligan. | |
| 2,395,673 | 2/1946 | Krantz | 189/76 |
| 2,538,138 | 1/1951 | Webster | 189/46 |
| 2,872,711 | 1/1956 | Killebrew | 20/11 |
| 2,916,112 | 12/1959 | Kiehl | 189/75 |
| 3,200,913 | 8/1965 | Nelson | 189/36 |
| 3,677,433 | 7/1972 | Collins | 220/4 |
| 3,782,054 | 1/1974 | Goss, Jr. | 52/758 |
| 3,829,226 | 8/1974 | Kreusel | 403/295 |
| 3,848,390 | 11/1974 | Anderson et al. | 52/758 |
| 3,854,245 | 12/1974 | Anderson | 49/449 |
| 3,866,380 | 2/1975 | Benson | 52/656 |
| 3,899,258 | 8/1975 | Matthews | 403/292 |
| 4,076,438 | 2/1978 | Bos | 403/297 X |
| 4,090,799 | 5/1978 | Crotti et al. | 403/401 |
| 4,124,322 | 11/1978 | Parisien | 403/295 |
| 4,222,209 | 9/1980 | Peterson | 52/172 |
| 4,296,587 | 10/1981 | Berdan | 52/788 |
| 4,380,110 | 4/1983 | Harig | 29/525 |
| 4,635,410 | 1/1987 | Chumbley | 52/63 |

FOREIGN PATENT DOCUMENTS

| | | | |
|---|---|---|---|
| 685067 | 1/1967 | Belgium | 52/656 |
| 1105596 | 4/1961 | Fed. Rep. of Germany | 403/402 |
| 1193314 | 5/1965 | Fed. Rep. of Germany | 403/402 |
| 2238383 | 2/1975 | France | 403/402 |
| 1264534 | 2/1972 | United Kingdom | 402/295 |

Primary Examiner—David A. Scherbel
Assistant Examiner—Jerrold D. Johnson
Attorney, Agent, or Firm—Merchant, Gould, Smith, Edell, Welter & Schmidt

[57] ABSTRACT

The present invention comprises a corner fastener for securing a first and second frame member together to form a corner of a frame. The corner fastener, in one embodiment, includes a first leg member cooperatively connected to a second leg member. Proximal sections of the leg members have raised surfaces which act as a pivoting point when the corner lock is utilized. In addition, the leg members have distal sections which are deformable, during installation, to assist in the alignment and adjustment of the mitre angle.

11 Claims, 3 Drawing Sheets

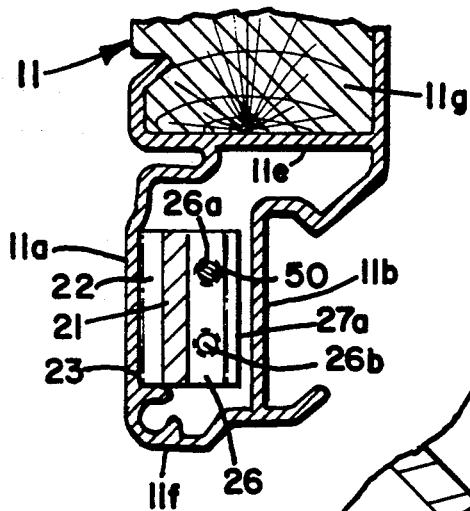
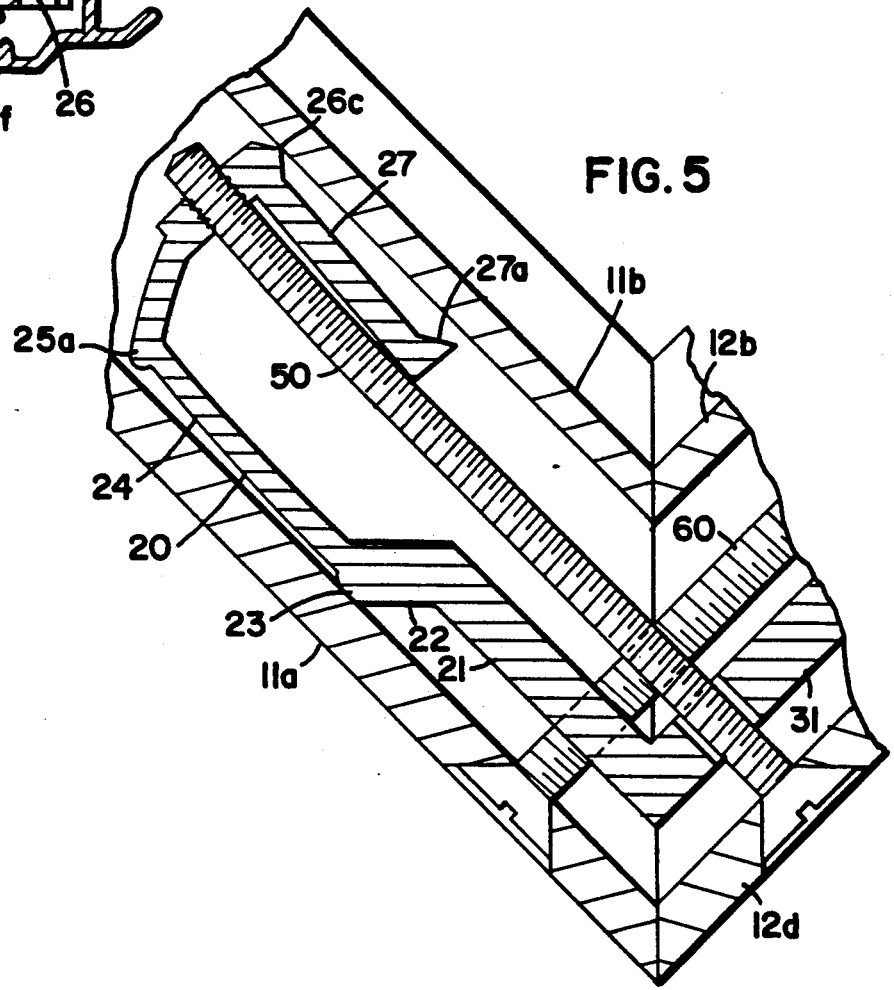

CORNER LOCK

FIELD OF THE INVENTION

This invention relates generally to a corner fastener for use in securing first and second frame members together to form a frame and more particularly to a corner fastener which provides for better alignment of a mitre joint formed when the two frame members are fastened together to form the frame.

DESCRIPTION OF THE PRIOR ART

Corner locks are well known in the window and door construction industry. Corner locks are used to join and secure two frame members together. Typically, the frame members have a 45° mitre and when there are brought together they form a 90° corner. The corner lock functions not only to secure the two frame members together, but also, ideally, to properly align the frame members so that the two frame members are properly aligned along their 45° mitres so as to form a true 90° angle when the frame members are secured to each other. The joint angles do not necessarily have to be 90°. The joint angles could be 105°, 70°, 150°, etc. with corresponding mitre angles of one-half of the joint angle. In addition, it is possible for stepped joints to utilize a corner lock.

One of the problems associated with making corner joints is that the angles which the frame members are cut are not necessarily accurate. That is, for a 90° corner, the mitre angles may be cut at 46°, 44°, or other angles close to but not exactly 45°. Then, if two non-45° angle members are utilized, the total true angle would not be 90°. It has been difficult for corner locks of the prior art to fully compensate for such inaccuracies.

Typically, the corner lock indexes off of an outside surface of the frame and must rely on the proper placement of the screw hole or on friction fit for proper joining of the frame members. There is usually no room for adjusting the mitre.

The present invention provides for an improved corner lock wherein a fulcrum effect is utilized to provide for proper adjustment of the mitre between the two frame members. In addition, in a preferred embodiment, a second, deformable member, is provided which allows force to be brought to the inside of the mitre.

BRIEF DESCRIPTION OF THE DRAWINGS

FIG. 5 is a cross-sectional view, similar to FIG. 2, but showing the corner lock deformed.

FIG. 6 is a cross-sectional view taken generally along the lines 6—6.

SUMMARY OF THE INVENTION

Figure 1:
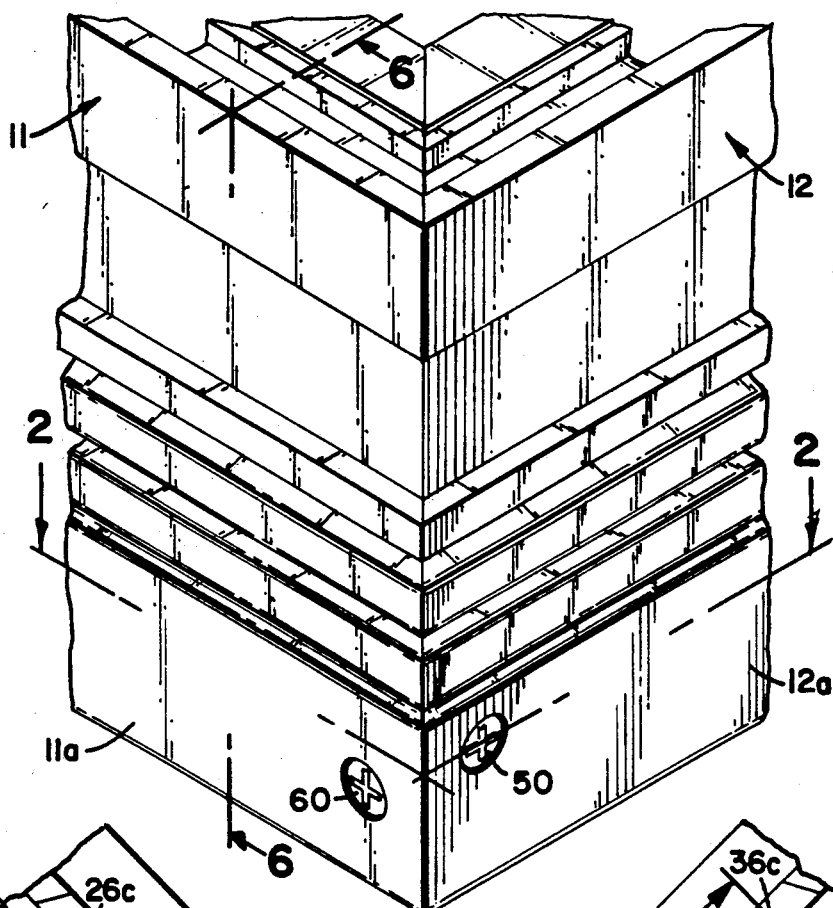
FIG. 1 is a perspective view of two frame members joined together in accordance with the present invention.

The invention is a corner fastener for use in securing a first and second frame member together to form a corner of a frame. The frame members each have a mitred end and each of the frame members forming an opening and cavity at its mitred end. The cavities have upper and lower surfaces. The fastener includes a first leg member having first and second ends and a second leg member, having first and second ends. The first ends are cooperatively connected to each other. The leg members each have proximal and distal sections. The proximal sections have an aperture formed therein for receiving fastening members. The distal sections are raised relative to the proximal sections respectively, whereby when the fastener is inserted into the channel members, the distal section of the first leg member contacts the upper surface of the first channel opening and the distal section of the second leg section contacts the upper surface of the second channel opening, wherein the distal sections act as a fulcrum when the fastening members are tightened through the apertures and brought closer into the channel members, thereby permitting alignment and adjustment of the mitres of the first and second frame members.

In addition, in another embodiment, the corner fasteners may further include a first leg member having an auxiliary section cooperatively connected to the distal section and depending generally downward and inwardly. The auxiliary section of the first leg member has an aperture for receiving a first fastening member. The second leg member also has an auxiliary section cooperatively connected to the distal section and depends generally downwardly and inwardly. The auxiliary section of the second leg member has an aperture for receiving a second fastening member, whereby the inside mitre of the first and second channel members may be further tightened and aligned.

In a preferred embodiment, the auxiliary sections are designed to deform upon tightening of the fastening members. Still further, the invention includes a frame utilizing the aforementioned corner fastener.

DETAILED DESCRIPTION OF THE PREFERRED EMBODIMENT

Referring to the drawings, wherein like numerals represent like parts throughout the several views, there is generally disclosed at 10 a corner lock fastener. The corner lock fastener 10 is used to secure two frame members 11 and 12 together to form a corner. The first frame member 11 and second frame member 12 may take any suitable configuration, depending upon the ultimate configuration of the frame to be constructed. Such frame members are well known in the window and door construction industry. As previously stated, the outside profile of the frame members 11 and 12 will depend upon the specific esthetics which the designer wishes to create. The frame members 11 and 12 are shown having a 45° mitre. However, it is understood that other suitable angles may be used if a 90° corner is not desired.

The first frame member 11 has an outside wall 11a and an inside wall 11b. The outside wall 11a is generally parallel to and spaced from the inside wall 11b to form a channel cavity 11c. As can been seen in FIG. 6, the inside wall 11a and outside wall 11b are cooperatively connected by an appropriate top member 11a and bottom member 11f. In addition, above the top member is a configuration which will allow a wooden frame member 11g to be inserted and secured. The exact details of the structure are not discussed in that any suitable configuration may be utilized. However, it is the channel cavity 11c, which is created between the outside wall 11a and inside wall 11b which is necessary to form a cavity to receive the corner lock fastener 10. While the cavity is shown as a continuous channel in the frame, it is understood that the cavity need not be continuous, but for ease of construction and design, usually is a continuous channel.

The profile of the second frame member 12 is a mirror image of the profile of the first frame member 11, as shown in FIG. 6. Similar to the first frame member 11, the second frame member 12 has an outside wall member 12a spaced apart and generally parallel to an inside wall member 12b forming a channel cavity 12c. The cavity 12c is for receiving the corner lock fastener 10. The outside wall 11a has a screw hole 11d and the second frame member 12 has a screw hole 12d. As clearly shown in FIG. 2, the ends of the frame members 11 and 12 are cut at a 45° angle so that when they are brought together, they form a 90° corner. The figures show a 90° corner formed by two 45° angles. It is understood that 90° corners, as well as other corners, may be formed by stepped joints and not only by a straight mitre.

The corner lock fastener 10 has a first leg member 20 cooperatively connected to a second leg member 30 and preferably is formed of a one-piece unitary construction. The second leg 30 is a mirror image of the first leg 20. The corner lock fastener 10 may be made of any suitable material such as 6063 aluminum. The first leg member 20 is generally perpendicular, or 90°, to the second leg member 30. However, it is understood that for frames of other than 90°, a different angle would necessarily be formed between the first leg member 20 and second leg member 30.

The first leg 20 has a first proximal section 21 to which an angled flange 22, having a raised engaging surface 23 is cooperatively connected. The proximal section 21 has two holes 21a and 21b formed therethrough. A distal section 24 is cooperatively connected to the angled flange 22 at a point lower than the raised engaging surface 23 which, as will be more fully discussed hereafter, acts as a pivot point. The distal section 24 is generally parallel to the proximal section 21, but at a raised elevation. A first segment 25 is cooperatively connected to the distal section 24. The first segment 25 has a raised engaging surface 25a. The raised engaging surfaces 23 and 25a are at the same elevation such that when they are placed in an aligned channel cavity 11c, the engaging surfaces would both touch the inside surface of the outer wall 11a. The first segment 25 angles inward and is cooperatively connected to a second segment 26 which has two threaded holes 26a and 26b. The second segment is generally perpendicular to the distal section 24 and proximal section 21. The second segment 26 has a lower engaging surface 26c. Cooperative connected to the second segment 26 is a third segment 27. The third segment 27 is generally parallel to the distal section 24 and proximal section 21. The third segment 27 has a lower engaging surface 27a. The lower engaging surfaces 26c and 27a are generally in the same plane and at the same elevation.

The first segment 25, second segment 26, and third segment 27 form what may be referred to as a first auxiliary section 28.

The second leg 30 has a first proximal section 31 to which an angled flange 22, having a raised engaging surface 33, is cooperatively connected. The proximal section 31 has two holes 21a and 21b formed therethrough. A distal section 34 is cooperatively connected to the angled flange 32 at a point lower than the raised engaging surface 33 which, as will be more fully discussed hereafter, acts as a pivot point. The distal section 34 is generally parallel to the proximal section 31, but at a raised elevation. A first segment 35 is cooperatively connected to the distal section 34. The first segment 35 has a raised engaging surface 35a. The raised engaging surfaces 33 and 35a are at the same elevation such that when they are placed in an aligned channel cavity 12c, the engaging surfaces would both touch the inside surface of the outer wall 12a. The first segment 35 angles inward and is cooperatively connected to a second segment 36 which has two threaded holes 36a and 36b. The second segment is generally perpendicular to the distal section 34 and proximal section 31. The second segment 36 has a lower engaging surface 36c. Cooperative connected to the second segment 36 is a third segment 37. The third segment 37 is generally parallel to the distal section 34 and proximal section 31. The third segment 37 has a lower engaging surface 37a. The lower engaging surfaces 36c and 37a are generally in the same plane and at the same elevation.

The first segment 35, second segment 36, and third segment 37 form what may be referred to as a second auxiliary section 38.

Figure 4:
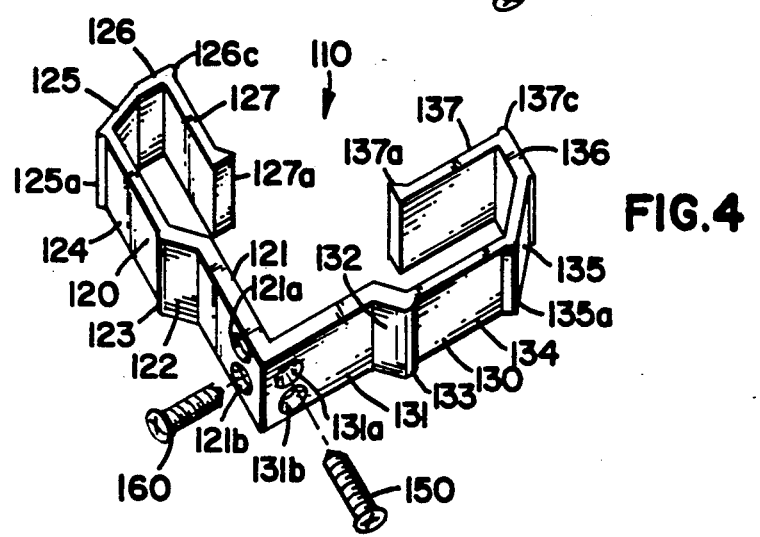
FIG. 4 is a perspective view of a second embodiment of the corner lock of the present invention.

A second embodiment of the present invention is shown in FIG. 4. The corner lock fastener 110 is similar in construction to the corner lock 10. The corner lock 110 has a first leg 120, first section 121, angle flange 122, having a raised engaging surface 123, distal section 24, first segment 125 having a raised engaging surface 25a, second segment 126, having a lower engaging surface 126c and a third segment 127 having a lower engaging surface 127.

The corner lock 110 has a second leg 130, second section 131, angle flange 132, having a raised engaging surface 133, distal section 134, first segment 125 having a raised engaging surface 135a, second segment 126, having a lower engaging surface 126c and a third segment 127 having a lower engaging surface 127.

The differences in construction between the corner lock 110 and the corner lock 10 is that the corner lock 110 does not have threaded holes in the second segments 126 and 136. Further, for reasons as will be described hereafter, the holes 121a and 121b in the first section 121 and the holes 131a and 131b in the first section 131 are threaded as opposed to being through holes, as are holes 21a, 21b, 31a and 31b.

In operation, the first leg 20 of the corner lock 10 is inserted into the cavity opening 11c of the frame member 11. The frame member 12 is then brought proximate the corner lock 10 and the second leg 30 is positioned in the cavity 12c of the frame member 12. The frame members 11 and 12 are then initially adjusted to a position wherein their 45° mitres are in alignment. A screw 50 is then inserted through hole 12d, hole 31a and pushed through until the threaded segment of the screw 50 engages the threaded hole 26a. Similarly, a screw 60 is then inserted through the screw hole 11d and hole 21b until the threaded portion of the screw 60 engages the threaded hole 36b. The screws 50 and 60 are then alternately tightened until the head of the screws are in position against the outside walls 11a and 12a. The sections 27 and 37 are also used to temporarily index and hold the corner lock 10 in place prior to and during assembly.

Figure 2:
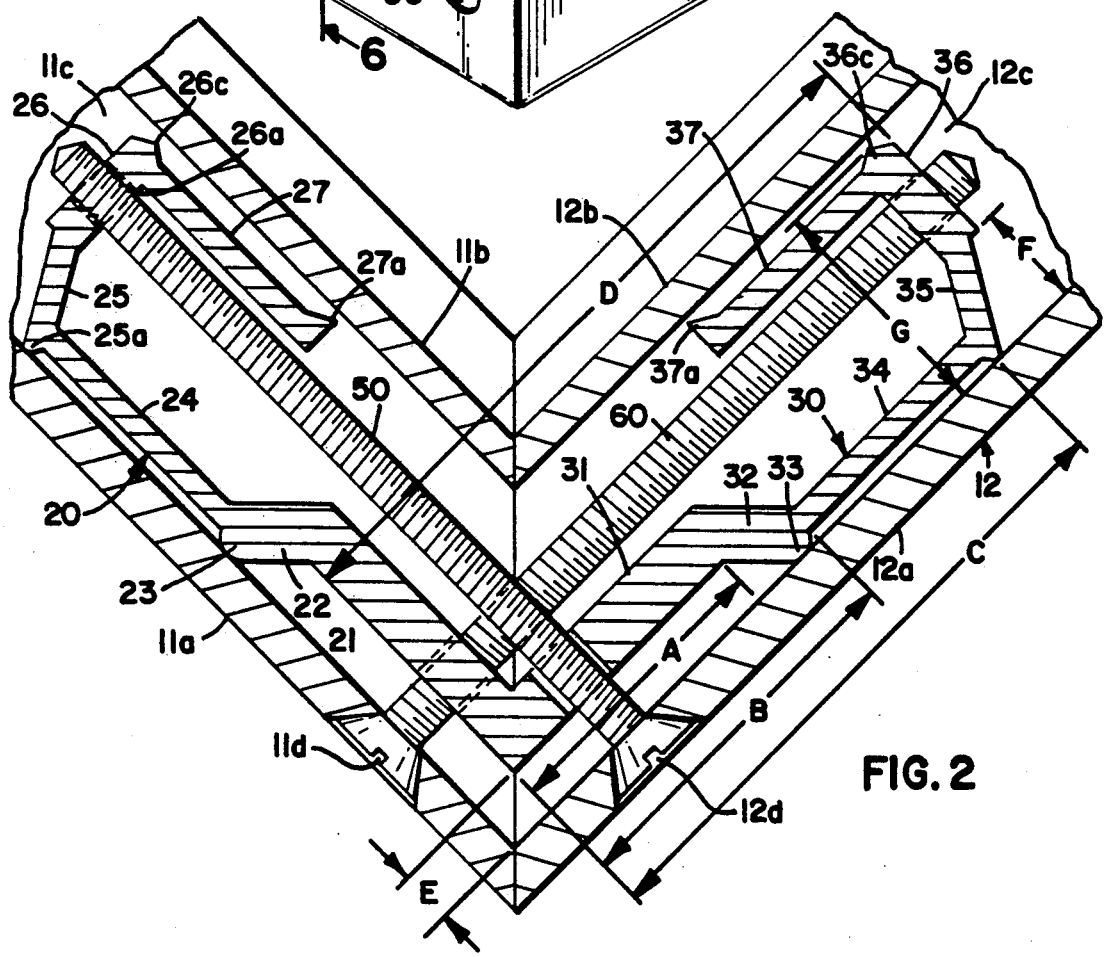
FIG. 2 is a cross-sectional view taken generally along the lines 2—2 in FIG. 1.
Figure 3:
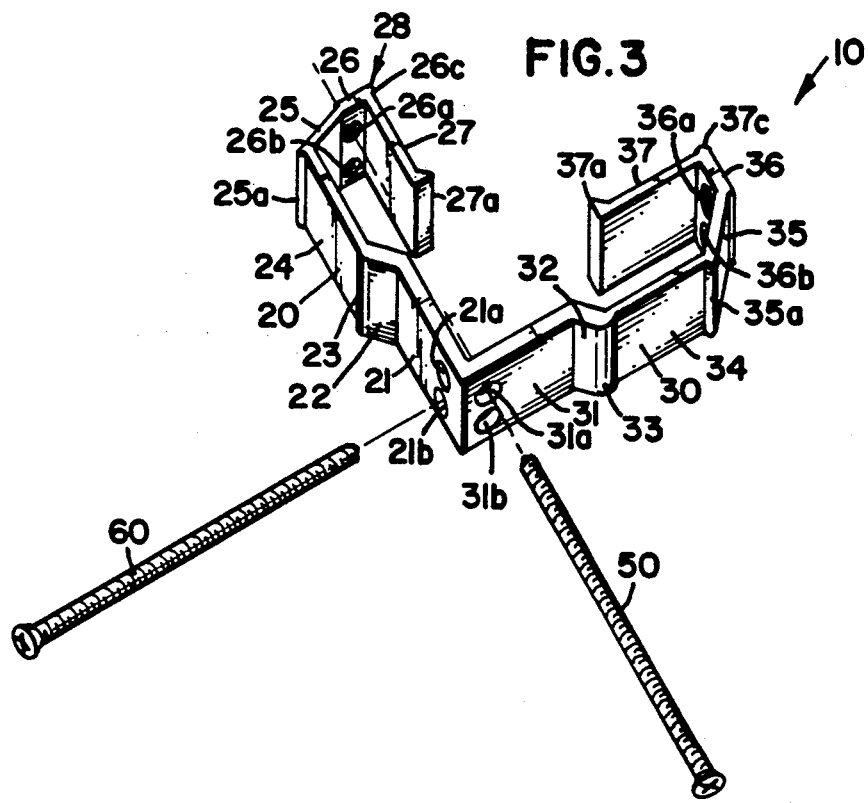
FIG. 3 is a perspective view of a first embodiment of the corner lock, as shown in FIG. 2.

Ideally, if everything is in perfect alignment, the corner lock would appear as in FIG. 2. However, it must be realized that in production, certain items may be slightly out of alignment. It is then that the corner lock of the present invention is utilized to provide an aligned mitre joint. In tightening the screw 50, the screw is engaging the threaded hole 26a. As the screw 50 rotates, the first leg 20 is drawn closer to the frame member 12 and at the same time, the first leg 20 begins to deform by pivoting about the raised engaging surface 23 and as the screw 50 is continued to be turned, the engaging surface 26c comes in contact with the inner surface of the outer wall 11b. This causes the deformation of the auxiliary section 28 as shown in FIG. 5. The distal section 24 begins to bend slightly raising the engaging surface 25a off of the inner surface of the outside wall 11a.

Similar interaction occurs as screw 60 is tightened. In tightening the screw 60, the screw is engaging the threaded hole 36a. As the screw 60 rotates, the second leg 30 is drawn closer to the frame member 11 and at the same time, the second leg 30 begins to deform by pivoting about the raised engaging surface 33 and as the screw 60 is continued to be turned, the engaging surface 36c comes in contact with the inner surface of the outer wall 12b. This causes the deformation of the auxiliary section 38 as shown in FIG. 5. The distal section 34 begins to bend slightly raising the engaging surface 35a off of the inner surface of the outside wall 12a.

The corner lock 10 is designed such that the deformation takes place at the auxiliary sections 28 and 38. This is accomplished by having the proximal sections 21 and 31 and angled flanges 22 and 32 having a greater thickness, and therefore greater strength, than the distal sections 24 and 34. Alternately, but not as economically to produce, the sections could be made of materials having the same thickness but of different strength to accomplish the same purpose.

Further, when the engaging surfaces 26c and 36c contact their respective inner walls, this has the tendency to cause a slight rotation of the frame members 11 and 12 inward, thereby tightening the inner mitre joint.

In a preferred embodiment, the proximal sections 21 and 31 and angled flanges 22 and 32 have a thickness of approximately ⅛ inch, whereas the distal sections 24 and 34, first segments 25 and 35 and third segments 27 and 37 have a thickness of approximately ½ the thickness or approximately 1/16 inch. The second segments 26 and 36 have a thickness of approximately 0.1 inches.

The distances represented in FIG. 2 are as follows:
A—0.669 inches
B—0.857 inches
C—1.448 inches
D—1.625 inches
E—0.125 inches
F—0.250 inches
G—0.552 inches It is of course understood that the distances are given to only show the distances of a preferred embodiment. Other suitable combinations of distances may be used depending upon the final design that is desired as well as the frame members in which the corner lock is used.

The operation of the second embodiment is very similar to that of the first embodiment. However, in the second embodiment, the threaded holes are in the proximal sections and not the distal sections. The corner lock 110 is inserted into the cavity opening 11c of the frame member 11. The frame member 12 is then brought proximate the corner lock 110 and the second leg 130 is positioned in the cavity 12c of the frame member 12. The frame members 11 and 12 are then initially adjusted to a position wherein their 45° mitres are in alignment.

A screw 150 is then inserted through hole 12d and 131a and engages the threaded hole 131a. Similarly, the screw 160 is then inserted through the screw holes 11d and hole 121b and engages the threaded hole 121b. The screws 150 and 160 are then alternately tightened until the head of the screws are positioned against the outside walls 11a and 12a. Similar to the first embodiment, deformation of the distal sections occur. The second corner lock 110 also has raised distal sections so that the raised distal sections act as fulcrums as the screws 150 and 160 are tightened. The auxiliary sections of the second corner lock 110 also deform, similar to the first embodiment. However, because the screws 150 and 160 are not pulling against the second segments 126 and 136, there is not as much pressure against the inside walls 11b and 12b. There is some alignment of the inner mitre between the frame members, but not to the extent that there is with the first embodiment. However, both embodiments are similar in that the raised distal sections allow for pivoting of the corner locks 10 and 110 while being tightened. The corner locks 10 and 110 provide for a means of securing a corner frame wherein there are poorly cut mitre angles. That is, if the angles are not true 45° angles for a 90° corner, the corner locks 10 and 110 allow for alternating adjustment to give the best possible fit of the inaccurately cut mitres.

Other modifications of the invention will be apparent to those skilled in the art in light of the foregoing description. This description is intended to provide specific examples of individual embodiments which clearly disclose the present invention. Accordingly, the invention is not limited to these embodiments of the use of elements having specific configurations and shapes as presented herein. All alternative modifications and variations of the present invention which follow in the spirit and broad scope of the appended claims are included.

We claim:

1. A unitary corner fastener for use in securing first and second frame members with use of first and second fastening members together to form a corner of a frame, the frame members each having a mitered end and each of the frame members forming an opening and channel cavity at its mitred end, said channel cavities being a first channel cavity in said first frame member and a second channel cavity in said second frame member said channel cavities having first surfaces and second, opposite surfaces, said fastener comprising:
   (a) a first leg member having a first and second end, and a second leg member, having a first and second end, said first ends cooperatively connected to each other at an intersection;
   (b) said leg members in relation to the intersection each having proximal and distal sections;
   (c) said proximal sections each having a threaded aperture formed therein for receiving fastening members; and
   (d) said distal sections being offset relative to said proximal sections respectively, whereby when said fastener is inserted in the channel cavities, said distal section of the first leg member contacts the first surface of the first channel cavity and the distal section of the second leg section contacts the first surface of the second channel cavity, wherein said distal sections act as a fulcrum against the first surfaces when the fastening members are tightened through said apertures and brought closer to the frame members by rotation of said fastening members in said threaded apertures, thereby permitting alignment and adjustment of the mitres of the first and second frame members.

2. The corner fastener of claim 1, wherein the first leg member is substantially perpendicular to the second leg member.

3. A unitary corner fastener for use in securing first and second frame members with use of first and second fastening members together to form a corner of a frame, the frame members each having a mitered end and each of the frame members forming an opening and channel cavity at its mitred end, said channel cavities being a first channel cavity in said first frame member and a second channel cavity is said second frame member, said channel cavities having first surfaces and second, opposite surfaces, said fastener comprising:

(a) a first leg member having a first and second end, and a second leg member, having a first and second end, said first ends cooperatively connected to each other at an intersection;

(b) said leg members in relation to the intersection each having proximal and distal sections;

(c) said proximal sections each having an aperture formed therein through which the fastening members may pass;

(d) said first leg member having an auxiliary section cooperatively connected to said distal section, said auxiliary section of said first leg having an a threaded aperture for receiving the first fastening member;

(e) said second leg member having an auxiliary section cooperatively connected to said distal section, said auxiliary section of said second leg having a threaded aperture for receiving the second fastening member; and (f) said distal sections being offset relative to said proximal sections respectively, whereby when said fastener is inserted in the channel cavities, said distal section of the first leg member contacts the first surface of the first channel cavity and the distal section of the second leg section contacts the first surface of the second channel cavity, wherein said distal sections act as a fulcrum against the first surfaces when the fastening members are tightened through said threaded apertures and brought closer to the frame members by rotation of said fastening members in said threaded apertures, thereby permitting alignment and adjustment of the mitres of the first and second frame members.

4. The corner fastener of claim 3, further comprising said auxiliary sections having two points of contact.

5. The corner fastener of claim 3 wherein the auxiliary sections deform, thereby tightening and aligning further an inner portion of the mitre.

6. A frame corner comprising:

(a) a first frame member having a mitred end and forming an opening and channel and first channel cavity at its mitred end;

(b) a second frame member having a mitred end and forming an opening and second channel cavity member at its mitred end;

(c) both of said cavities having first surfaces and second, opposite surfaces; and (d) a corner fastener for cooperatively connecting said first frame member to said second frame member, said fastener comprising:

(i) a first leg member having a first and second end, and a second leg member, having a first and second end, said first ends cooperatively connected to each other at an intersection;

(ii) said leg members in relation to the intersection each having proximal and distal sections;

(iii) said proximal sections each having a threaded aperture formed therein for receiving fastening members; and (iv) said distal sections being offset relative to said proximal sections respectively, whereby when said fastener is inserted in the channel cavities, said distal section of the first leg member contacts the first surface of the first channel cavity and the distal section of the second leg section contacts the first surface of the second channel cavity, wherein said distal sections act as a fulcrum against the first surfaces when the fastening members are tightened through said apertures and brought closer to the frame members by rotation of said fastening members in said threaded apertures, thereby permitting alignment and adjustment of the mitres of the first and second frame members.

7. The frame corner of claim 6, wherein the first leg is generally perpendicular to the second leg.

8. The frame corner of claim 6, wherein the first frame member has generally at 45° mitred end and the second frame member has generally a 45° mitred end.

9. A frame corner comprising:

(a) a first frame member having a mitred end and forming an opening and channel and first channel cavity at its mitred end;

(b) a second frame member having a mitred end and forming an opening and second channel cavity member at its mitred end;

(c) both of said cavities having first surfaces and second, opposite surfaces; and (d) a corner fastener for cooperatively connecting said first frame member to said second frame member, said fastener comprising:

(i) a first leg member having a first and second end, and a second leg member, having a first and second end, said first ends cooperatively connected to each other at an intersection;

(ii) said leg members in relation to the intersection each having proximal and distal sections;

(iii) said proximal sections each having an aperture formed therein through which the fastening members may pass;

(iv) said first leg member having an auxiliary section cooperatively connected to said distal section, said auxiliary section of said first leg having an a threaded aperture for receiving the first fastening member;

(v) said second leg member having an auxiliary section cooperatively connected to said distal section, said auxiliary section of said second leg having a threaded aperture for receiving the second fastening member; and (vi) said distal sections being offset relative to said proximal sections respectively, whereby when said fastener is inserted in the channel cavities, said distal section of the first leg member contacts the first surface of the first channel cavity and the distal section of the second leg section contacts the first surface of the second channel cavity, wherein said distal sections act as a fulcrum against the first surfaces when the fastening members are tightened through said threaded apertures and brought closer to the frame members by rotation of said fastening members in said threaded apertures, thereby permitting alignment and adjustment of the mitres of the first and second frame members.

10. The frame corner of claim 9, further comprising said auxiliary sections having two points of contact.

11. The frame corner of claim 9, wherein the auxiliary sections deform, thereby tightening and aligning further an inner portion of the mitre.

* * * * *

UNITED STATES PATENT AND TRADEMARK OFFICE
CERTIFICATE OF CORRECTION

PATENT NO. : 5,010,708

DATED : April 30, 1991

INVENTOR(S) : Harold H. Evans and Todd W. Bruchu

It is certified that error appears in the above-identified patent and that said Letters Patent is hereby corrected as shown below:

ON TITLE PAGE: of the patent under item number [73], the name of the Assignee should be corrected to read "Andersen Corporation".

Signed and Sealed this

Fifteenth Day of September, 1992

Attest:

DOUGLAS B. COMER

Attesting Officer

Acting Commissioner of Patents and Trademarks